Figure 1:
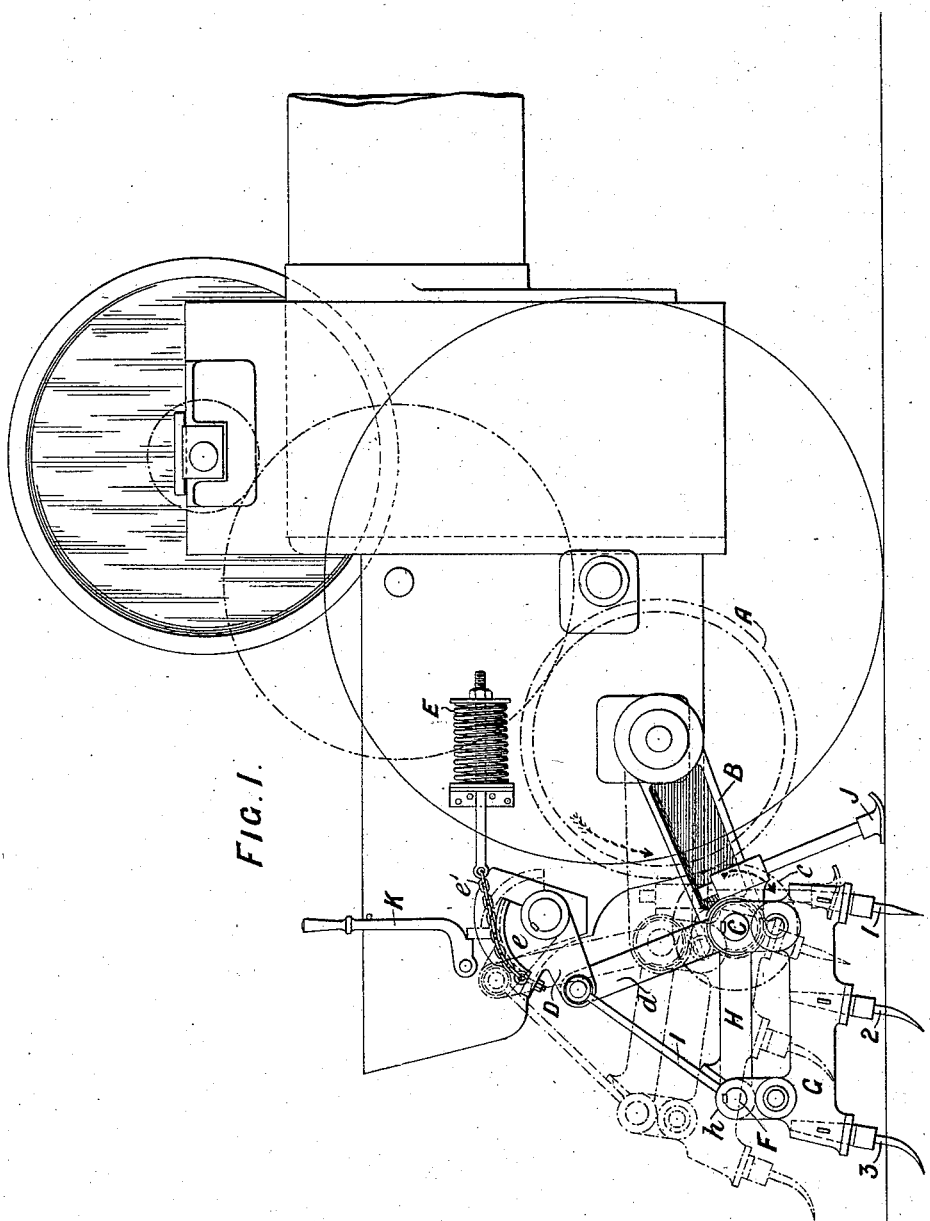

(No Model.) 2 Sheets—Sheet 1.
T. COOPER.
MACHINERY FOR CULTIVATING AND CLEARING LAND.

No. 571,082. Patented Nov. 10, 1896.

Witnesses:—
M. E. Filetcher.
George Barry Jr.

Inventor
Thomas Cooper
by attorneys
Brown & Seward (No Model.)  2 Sheets—Sheet 2.

T. COOPER.
MACHINERY FOR CULTIVATING AND CLEARING LAND.

No. 571,082. Patented Nov. 10, 1896.

Witnesses:—
M. E. Fletcher.
George Barry Jr

Inventor
Thomas Cooper
by attorneys

UNITED STATES PATENT OFFICE.

THOMAS COOPER, OF KING'S LYNN, ENGLAND.

MACHINERY FOR CULTIVATING AND CLEARING LAND.

SPECIFICATION forming part of Letters Patent No. 571,082, dated November 10, 1896.

Application filed July 9, 1896. Serial No. 598,504. (No model.)

*To all whom it may concern:*

Be it known that I, THOMAS COOPER, engineer, of The Elms, King's Lynn, in the county of Norfolk, England, have invented certain new and useful Improvements in Machinery for Cultivating and Cleaning Land, of which the following is a specification.

This invention has reference to agricultural engines which are provided with forks or diggers for cultivating and tilling the soil, such as are described in the specification of English patent, granted to me September 4, 1893, No. 16,616.

The invention covered by the above patent was partly directed to the maintenance of an even working depth for the diggers while the engine worked over uneven or irregular surfaces, and to that end a motor was provided for raising and lowering automatically the digger-shaft as the engine advanced, the initiative for starting and stopping the said motor being derived from a feeler following the ground-surface.

My present invention is also directed to the maintenance of an even working depth, but by different means, and it likewise relates to the arrangement of the diggers, whereby the cleaning and tilling of the land, particularly if it be light and friable, can be effected in one operation by the breaking up of the soil and throwing out the twitch and other weeds ready for raking off.

According to the present invention I provide for the maintenance of an even working depth in the following manner: The digger mechanism is suspended elastically, so that the forks, when the digging mechanism is not at work, are held normally clear of the ground. The driving-gear, however, for the digger mechanism is arranged in such manner that when running it overcomes the elastic suspension device, forces downward or depresses the digger mechanism, and with it the diggers carried thereby.

To avoid undue depression and to keep the diggers at an even working depth, a stop is provided in the form of a shoe or roller sliding or running in contact with the ground, which stop assists the springs or other suspension device to raise the diggers when passing an elevation and prevents the forks burying themselves too deeply in the ground.

For cultivating and cleaning light friable soils I prefer to employ three rows of forks arranged tandemwise. That nearest the engine breaks up the ground, and those behind, being curved, comb the loosened soil, so as to leave the twitch and other weeds on the surface ready for removal by raking or otherwise.

In the accompanying drawings I have shown a portion of an engine embodying my improvements.

Figure 2:
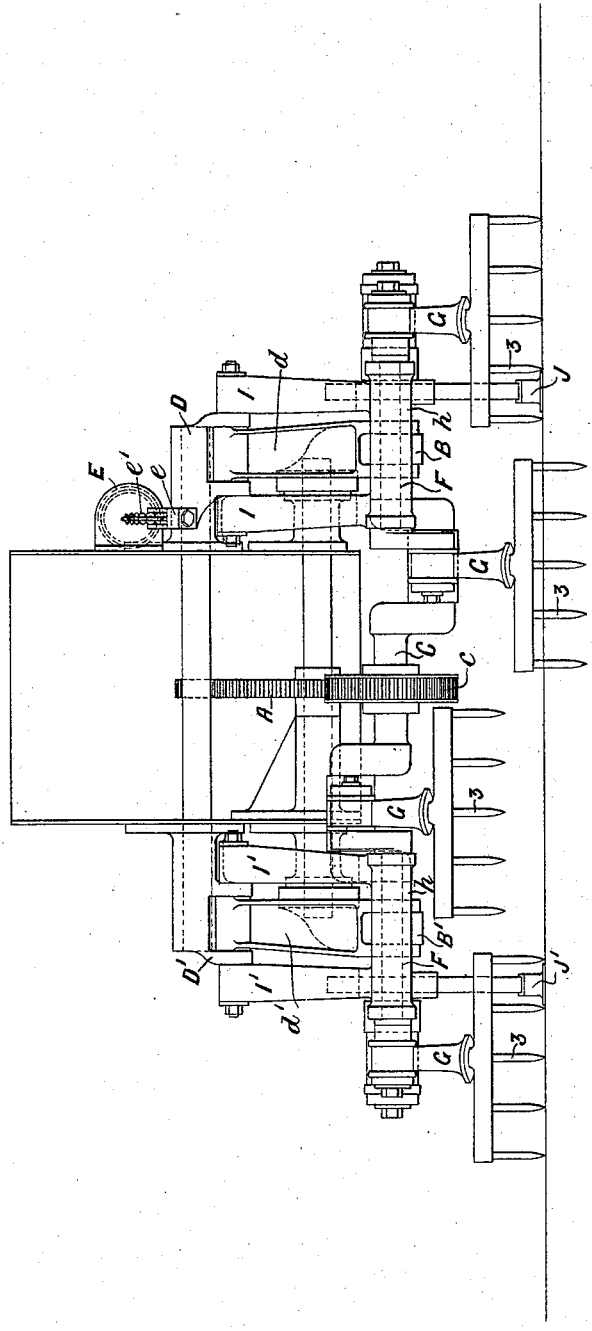

Figure 1 is a side elevation, and Fig. 2 is a back view.

A is the driving-wheel for the digger mechanism, which driving-wheel is suitably mounted and receives its rotation in the direction indicated by the arrow by any convenient train of gearing from the engine crank-shaft.

Pivoted on the outside of the engine-tender, in a position radial to the driving-wheel A, are arms B B'. The extremities of these arms B B' carry the bearings for the main crank-shaft C of the digger mechanism. This crank-shaft C, which has keyed thereon the spur-wheel $c$, engaging with the driving-wheel A, is also supported by arms $d\,d'$, pendent from lever-arms D D', pivoted to the engine-framing. The lever-arm D carries a segment $e$, attached by a chain $e'$ to the spring E, or equivalent elastic support, fixed to the engine-framing. Parallel with the digger crank-shaft C is the crank-shaft F, which is broken in the middle of its length into two parts, as shown in Fig. 2, for convenience in construction, but the two parts act practically as one shaft. The shaft F has cranks corresponding with the cranks of the shaft C and is coupled thereto by means of bars G, which link together the cranks, and by bars H, the backward ends of which are merged into the sleeve-bearings $h$ of the shaft F. The sleeves $h$ are moreover supported by two pairs of arms I I', pendent from and pivoted to the lever-arms D D above mentioned. The crank-shafts C and F are thus connected together, so that they rotate in unison when the shaft C is driven by the driving-wheel A, engaging with the spur-wheel $c$ on the shaft C.

J J' are stops carried by the arms B B' for preventing the undue depression of the digging mechanism.

The digging-forks are carried by the coupling-bars G, and are arranged in three rows tandemwise, one behind the other. Row 1—viz., that next the engine—consists of straight forks adapted to break up hard ground, the slightly-curved forks of row 2 comb the already broken soil, and the still more curved forks of row 3 further comb the soil, throwing up the weeds onto the surface ready for raking off.

From the foregoing it will be understood that the normal position of rest of the digger mechanism is that indicated in dotted lines, Fig. 1, in which position it may be held by the catch K, engaging with a projection on the segment e. The catch having been released and the engine having been started so as to drive the wheel A and spur-wheel c of the crank-shaft C in the direction of the arrows, the digging mechanism, which is elastically suspended, as above explained, is depressed by the action of the driving-gear overcoming the power of the suspension device. The movement of the digging mechanism is in an arc about the axis of the driving-wheel A by reason of the radial position of the arms B B', so that the engagement between the wheels A and c is properly maintained. The depression of the diggers is arrested by the stops J J' coming in contact with the ground. These stops, which can be either in the form of shoes or rollers, can be adjusted as to height so as to give any required working depth to the diggers. It is obvious that the stops J, being in close proximity to the diggers, which are continuously being pressed downward by the action of the driving-gear, constantly maintain the diggers at an even working depth, assisting the elastic suspension device to raise the diggers when the ground rises and permitting them to be lowered when a depression is reached. When the driving-gear is reversed or disengaged, the suspension device lifts the digger mechanism into normal position clear of the ground.

What I claim is—

1. In a digging-machine for cultivating and tilling the soil wherein the digging mechanism is elastically suspended, the combination with said digging mechanism of driving-gear substantially as herein described which by its own action tends to depress the said mechanism and hold the diggers in position to operate on the ground, as herein set forth.

2. The means hereinbefore described for maintaining the diggers at an even working depth, consisting of an elastic suspension device for the digger mechanism, driving-gear which, when in action, depresses the diggers into contact with the ground, and a stop or stops bearing on the ground-surface, to control the working position of the diggers, as set forth.

3. The elastically-suspended digging mechanism hereinbefore described, wherein are arranged parallel crank-shafts, operated in unison, and carrying rows of digging-forks of different forms adapted to break up the soil and to clean the weeds from the loosened ground, in a single operation, as set forth.

4. In digging-machines having rows of forks mounted one behind the other, the described arrangement wherein the first row of forks is made suitable for breaking up the ground, while the succeeding forks are more or less bent or curved, so as to rake or comb the loosened soil, and bring the weeds to the surface, as set forth.

THOMAS COOPER.

Witnesses:
H. K. WHITE,
JOSEPH LAKE.